Sept. 29, 1970     R. K. HILL     3,531,702
LOGIC CONTROL SYSTEM FOR BRUSHLESS D.C. MOTORS
Filed March 5, 1968     6 Sheets-Sheet 1
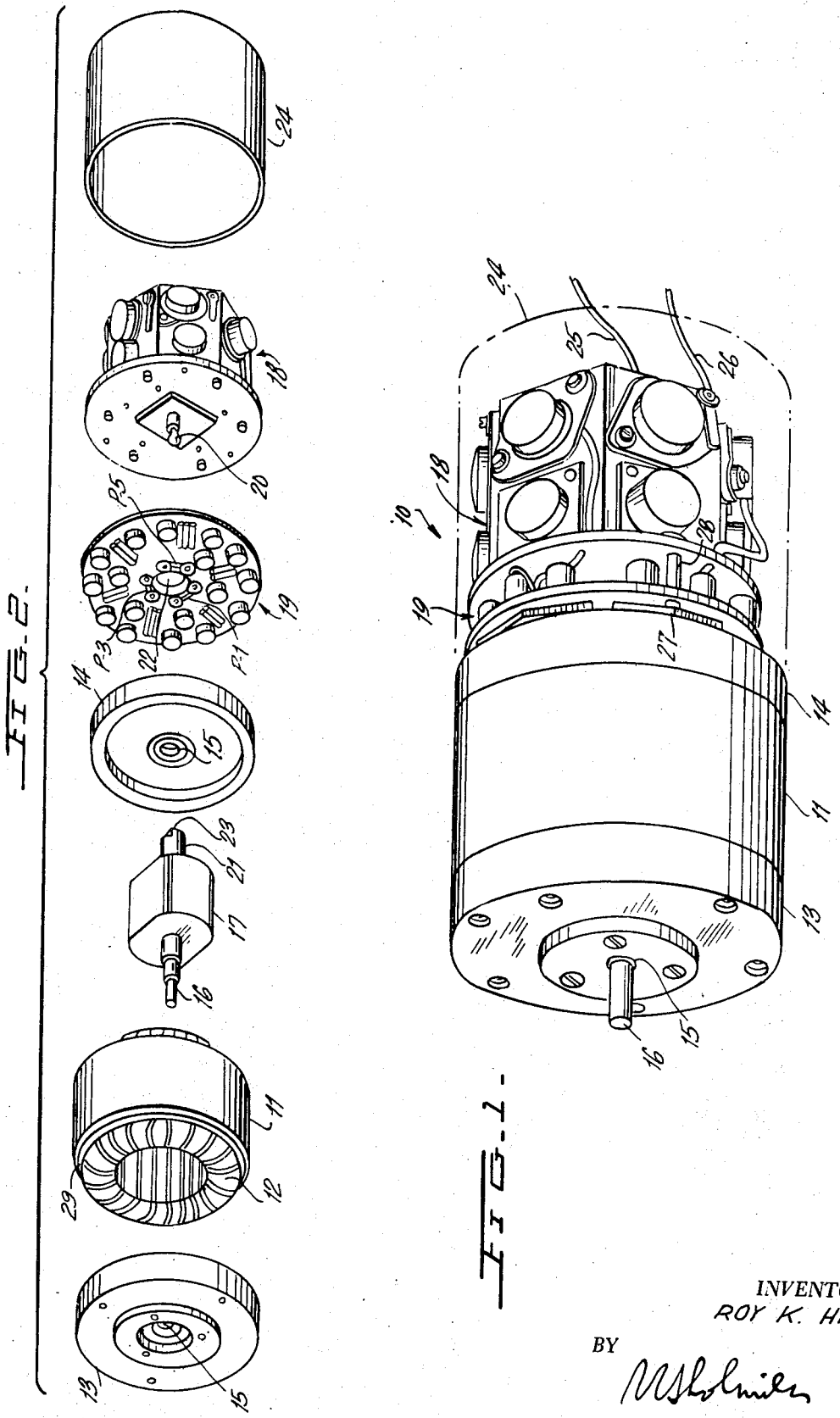
INVENTOR.
ROY K. HILL
BY
ATTORNEY

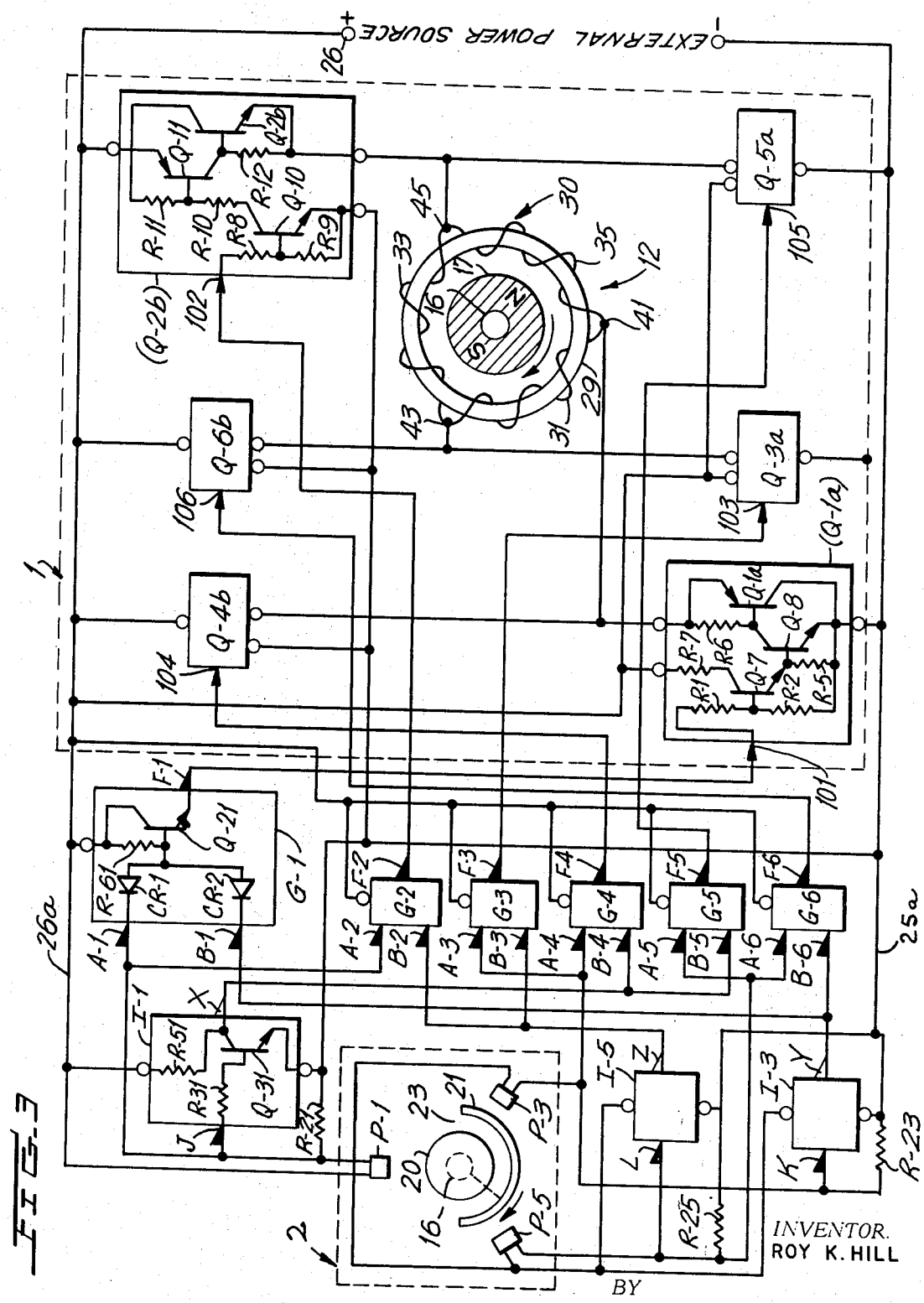

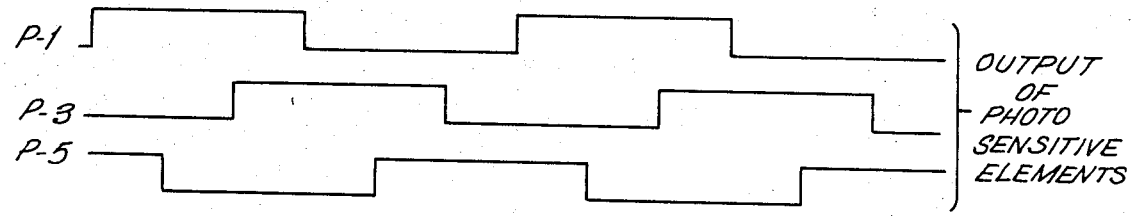
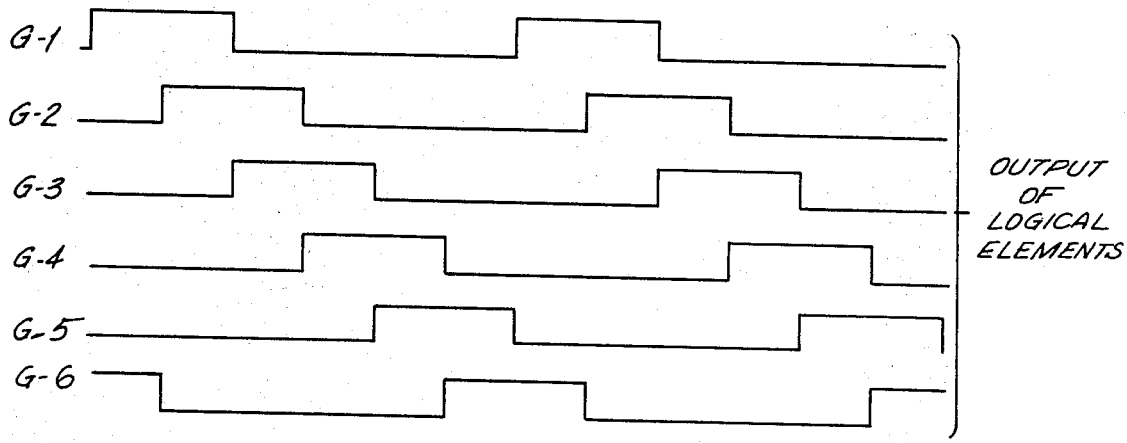
Fig. 4
INVENTOR.
ROY K. HILL

INVENTOR.
ROY K. HILL

Sept. 29, 1970
R. K. HILL
3,531,702
LOGIC CONTROL SYSTEM FOR BRUSHLESS D.C. MOTORS
Filed March 5, 1968
6 Sheets-Sheet 6
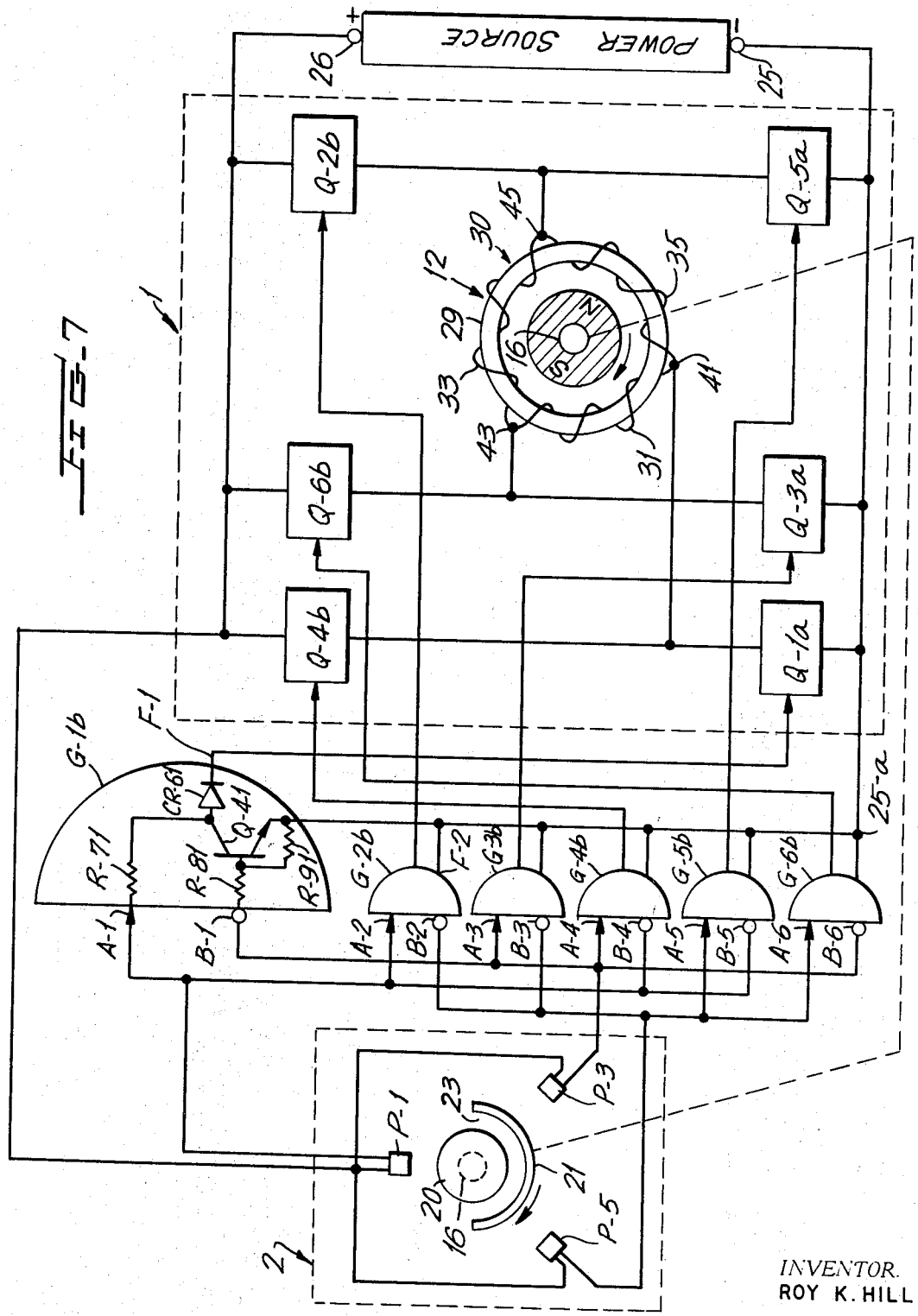
INVENTOR.
ROY K. HILL United States Patent Office 3,531,702
Patented Sept. 29, 1970

3,531,702
LOGIC CONTROL SYSTEM FOR BRUSHLESS D.C. MOTORS
Roy K. Hill, Bristol, Tenn., assignor to Sperry Rand Corporation, Bristol, Tenn., a corporation of Delaware
Filed Mar. 5, 1968, Ser. No. 710,472
Int. Cl. H02k 29/00
U.S. Cl. 318—138　　　　　　　　　　　　　　　10 Claims

ABSTRACT OF THE DISCLOSURE

A brushless DC motor is constructed with photo pickup device for detecting rotor position. A logic system consisting of "OR" gates and/or "AND" gates, connected in circuit to receive signals from photo sensitive devices, is utilized to control current switching in the stator winding. The logic system is so constructed that by utilizing three photo sensitive devices current switching in the armature occurs six times for each rotor revolution.

---

This invention relates to an improvement of the brushless DC motor construction illustrated in my copending application Ser. No. 524,016 filed Feb. 1, 1966, now Pat. No. 3,377,534, and more particularly relates to improved commutation means utilizing logic circuitry for controlling current switching in the armature winding.

In conventional direct current rotating machines, commutation is essentially a mechanical switching operation to advance and cyclicly reverse currents through the armature winding sections in sequence as a function of rotor position. This continuous switching process is accomplished by means of brushes and a segmented commutator so that commutation is, unfortunately, accompanied by friction, wear, and sparking with its attendant generation of RF noise. These disadvantages of mechanical commutation frequently prohibit utilization of DC motors in critical applications even though performance characteristics and input requirements favor the use of such motors in all other respects.

Early prior art attempts at providing brushless DC motors were for the most part limited to conversion of direct current to alternating current to effectively provide an AC induction motor, utilization of rotor velocity for switching control so that switching control is not effective at all positions of the rotor, utilization of a plurality of separate armature windings with each winding operating during only a portion of each rotor revolution thereby requiring a relatively large amount of magnetic and current carrying material as compared to mechanically commutated DC machines in which all winding positions are simultaneously energized, or utilization of circuitry having excessive voltage drops because of multiple elements constituting bilateral switching circuits developed from a plurality of unilateral transistor and diode devices with such circuits requiring a plurality of power sources.

In my copending application Ser. No. 228,849 filed Oct. 8, 1962, now Pat. No. 3,364,407 conventional mechanical commutation is simulated by an optical sensing system in conjunction with electronic switching by utilizing a permanent magnet rotor for field excitation in combination with a closed loop armature winding having a plurality of equally spaced taps. With such winding form the entire winding is always energized and only the winding taps are sequentially changed by brushless commutation in their electrical connections to the energizing source.

In the device of my aforesaid copending application Ser. No. 524,016 a closed loop armature winding configuration is utilized and provided with an odd number of winding taps. Pairs of taps located closest to 180° around the closed loop winding are operatively connected in sequence to the energizing source. The individual taps of each pair of taps being operatively connected to the energizing source are not operatively connected to the source at the same instant of time. Instead the individual taps are operatively connected in overlapping staggered sequence, simulating conventional commutation of an odd segment machine, but advancing and reversing currents in the armature conductor in a sequence as a function of rotor position.

There is disclosed in the device of my aforesaid copending application Ser. No. 524,016 a motor construction with an armature having three switching taps. Six photo sensitive pickups are utilized to detect rotor position and with such an arrangement tap switching occurs six times for each revolution of the rotor.

In the device of the instant invention three photo sensitive devices connected to a three tap close loop winding feed switching signals to solid state logic circuitry so constructed that switching of armature currents occurs six times for each rotor revolution. Thus, it is possible to eliminate half of the most troublesome elements (photosensitive devices) and still achieve the same number of armature switching operations for each rotor revolution thereby retaining smooth motor operation.

Accordingly a primary object of the instant invention is to provide an improved construction for a brushless DC motor.

Another object is to provide a brushless DC motor so constructed that the number of armature switching operations for each rotor revolution is greater than the number of radiation sensitive elements required to detect rotor position.

A further object is to provide a novel construction for a brushless DC motor utilizing solid state logic circuitry to control current switching in the armature responsive to signals generated by radiation sensitive pickup elements.

These objects as well as other objects of this invention will become readily apparent after reading the following description of the accompanying drawings in which:

FIG. 1 is a perspective of a brushless DC motor constructed in accordance with the teachings of the instant invention.

FIG. 2 is an exploded perspective of the main elements of FIG. 1.

FIG. 3 is an electrical schematic for the motor of FIG. 1, particularly illustrating an embodiment utilizing inverters and "AND" gates for commutating control.

FIG. 4 are graphs of the outputs for the photo sensitive elements and the logic elements in relation to rotor position.

FIG. 7 is a schematic showing a modification of the commutating switching means of FIG. 3, such modification utilizing inhibit gates.

Figure 5:
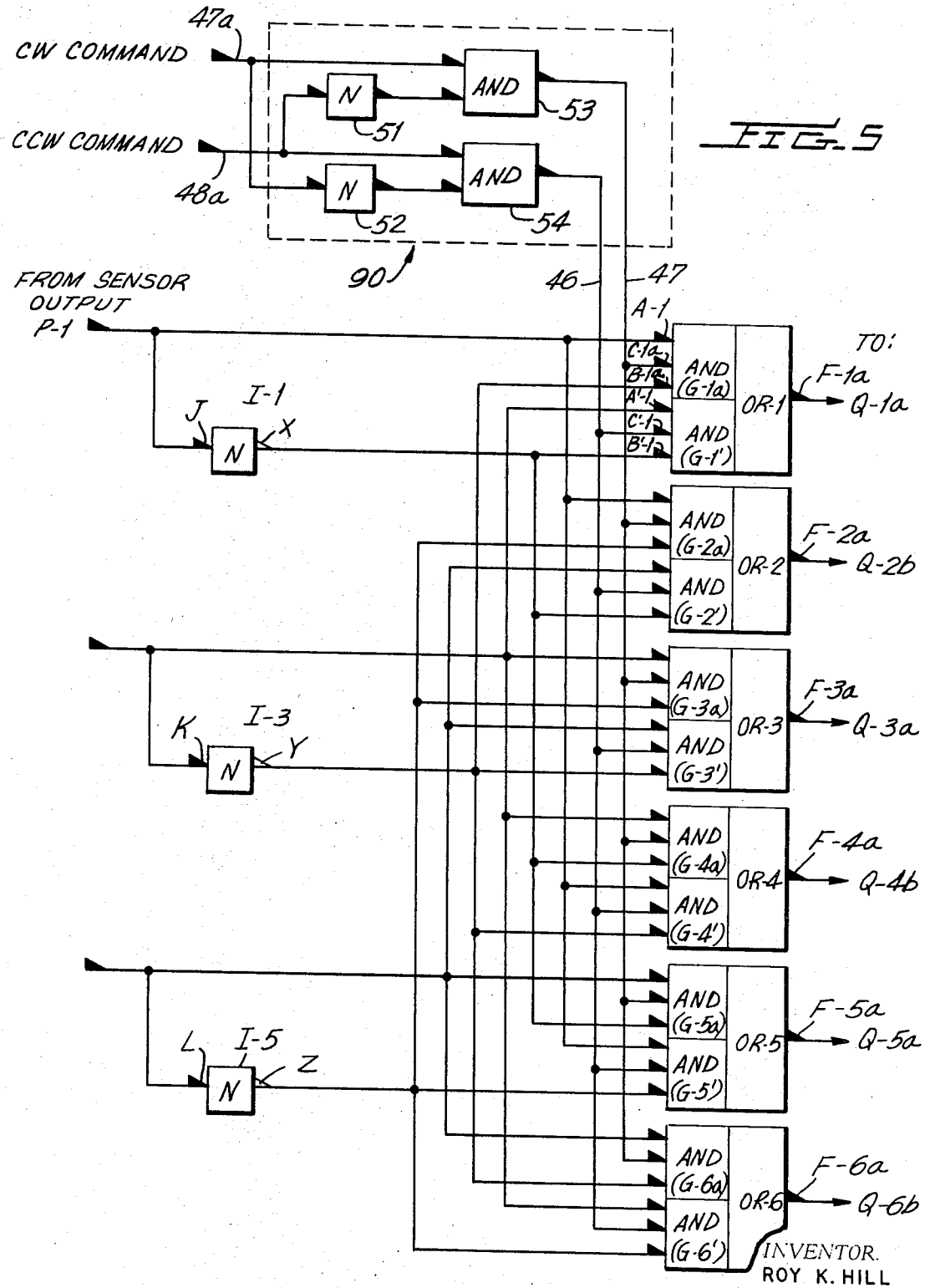
FIG. 5 is a schematic showing a modified version of the logic circuitry of FIG. 3 having provisions for reversal of rotation.

Now referring to the figures and particularly to the FIGS. 1 through 4. Brushless DC motor 10 comprises shell 11 surrounding stationary armature assembly 12. The ends of shell 11 are covered by front and back end caps 13, 14, respectively, each provided with suitable bearings 15 rotatably supporting motor shaft 16. Rotor 17 is a permanent magnet keyed to shaft 16 and disposed within armature assembly 12.

Stationary armature assembly 12 includes relatively low reluctance magnetic member 29 which is laminated and provided with teeth and slots wherein closed loop winding 30 is disposed and held by shell 11. Winding 30 consists of a conductor threading the slots of magnetic member 29 a plurality of times and finally joining the starting point. A plurality of equally spaced taps or juncture points 41, 43, 45 divide winding 30 into three sections or coil portions 31, 33, 35.

Commutation is achieved by means of solid state power switching unit 18 and solid state control and preamplifier unit 19 controlled by light source 20 and shield 21. Units 18 and 19 are mounted to the rear of end cap 14 and are operatively positioned by appropriate spacers 27, 28. Preamplifying unit 19 includes a plurality of radiation sensitive pickup devices, in this case photoelectric elements P–1, P–3, P–5, equally spaced from one another and centrally arranged about shield 21.

Light source 20, which provides radiation directed to impinge upon photoelectric devices P–1, P–3, P–5, is mounted to power switching unit 18 on the forward side thereof and extends through circular aperture 22 of preamplifying unit 19 to the interior of shield 21. The latter is keyed to motor shaft 16 and is disposed rearwardly of end cap 14 extending through aperture 22. Shield 21 is provided with aperture 23 so positioned and shaped that light emitted from source 20 and passing through aperture 23 will impinge upon at least one of the photoelectric devices P–1, P–3, P–5 for any angular position of rotor 17.

Cover 24 is provided as an enclosure for the elements to the rear of end cap 14. An appropriate aperture (not shown) in cover 24 permits the passage of leads 25, 26 for connecting motor 10 to a source of direct current.

Photoelectronic devices P–1, P–3, P–5 are of a type well known to the art with each possessing two states of conduction. That is, low conductance or high impedance when not illuminated, and high conduction or low impedance when illuminated. Since the position of rotor 17 determines the position of shield 21 and aperture 23, the position of rotor 17 determines which of the photoelectric devices P–1, P–3, P–5 is or are, as the case may be, illuminated for a particular angular position of rotor 17. Aperture 23 is approximately 180° wide so that at least one of the photoelectric devices P–1, P–3, P–5 is illuminated for any given position of rotor 17 and for some positions of rotor 17 two of the photosensitive devices P–1, P–3, P–5 will be illuminated. As will hereinafter become obvious this insures that armature 12 will always be energized for self-starting of motor 10 for all positions of shaft 16. Units Q–1a, Q–2b, Q–3a, Q–4b, Q–5a and Q–6b are solid state switching devices of the transistor family constructed to be operated as on-off saturated switches in a manner fully explained in my aforesaid co-pending application Ser. No. 228,849.

Operation of switching units Q–1a, Q–3a, Q–5a, Q–2b, Q–4b and Q–6b is controlled by photoelectric devices P–1, P–3, P–5 acting through a logic system comprising "two level" logical elements G–1, G–2, G–3, G–4, G–5, G–6, I–1, I–3 and I–5. As will hereinafter be explained, the function of these logical elements is to compare the signals received from selected pairs of photosensitive devices P–1, P–3, P–5 and produce six signals for controlling switch units Q–1a, Q–3a, Q–5a, Q–2b, Q–4b and Q–6b from three photosensors P–1, P–3, P–5 for each revolution of rotor 17, as compared to the normal requirement of having at least six photosensors to produce six switching signals for each revolution of the rotor.

Logical elements G–1 through G–6 are each a so-called "AND" gate. Output elements F–1 through F–6 of "AND" gates G–1 through G–6, respectively, are connected to the respective input elements 101 through 106 of the respective switching units K–1a, Q–3a, Q–5a, Q–2b, Q–4b and Q–6b.

Each "AND" gate G–1 through G–6 performs the function of producing a pre-assigned one of two output levels only when all input levels simultaneously correspond to a pre-assigned type of two possible levels. In particular, each of the "AND" gates G–1 through G–6 operates on essentially zero voltage for one level and a sufficiently high positive voltage for the other of the two levels. Thus, if a sufficiently high positive voltage appears simultaneously at input terminals A–1 and B–1 of gate G–1, a relatively high positive voltage will also appear at output terminal F–1 with this voltage being of sufficient magnitude to energize or actuate switching unit Q–1a to its low impedance or closed condition. However, if either or both of the input terminals A–1 or B–1 are at essentially zero voltage, output terminal F–1 will also be at essentially zero voltage.

Logic elements I–1, I–3 and I–5 are inverters which reverse or complement the level of the input signals. That is, when the input appearing at terminal J of inverter I–1 is at a sufficiently high positive voltage then the output at terminal X of inverter I–1 will be essentially zero voltage, but if the input is essentially zero the output will be at a relatively high positive voltage.

Resistor R–21 provides a relatively low impedance between bus 25a and input terminals A–1 and A–2 of "AND" gates G–1 and G–2, respectively. This relatively low impedance forces input terminals A–1 and A–2 of "AND" gates G–1 and G–2 to a relatively low voltage when P–1 is not illuminated. The value of resistor R–21 is chosen to be between the value of resistor R–61 in "AND" gate G–1 and the impedance of photo-device P–1 when the latter is illuminated. Resistor R–23 serves essentially the same purpose as resistor R–21, but in respect to "AND" gates G–3 and G–4. Similarly resistor R–25 performs this function for "AND" gates G–5 and G–6.

One terminal of each photosensitive device P–1, P–2, P–3 is connected to bus 26a. The other terminal of photosensitive device P–1 is connected to input terminal J of inverter I–1, and to input terminals A–1 and A–2 of "AND" gates G–1 and G–2. The other terminal of photosensitive device P–3 is connected to input terminal K of inverter I–3 and to input terminals A–3 and A–4 of "AND" gates G–3 and G–4. Similarly the other terminal of photosensitive device P–5 is connected to input terminal L of inverter I–5 and to input terminals A–5 and A–6 of "AND" gates G–5 and G–6.

Output terminal X of inverter I–1 is connected to input terminals B–4 and B–5 of "AND" gates G–4 and G–5, output terminal Y of inverter I–3 is connected to input terminals B–1 and B–6 of "AND" gates G–1 and G–6, while output terminal Z of inverter I–5 is connected to input terminals B–2 and B–3 of "AND" gates G–2 and G–3.

The constructions for logical inverters I–3 and I–5 are the same as the constrution for inverter I–1 so that only the latter will be described in detail. Inverter I–1 consists of resistor R–31, resistor R–51 and NPN transistor Q–31. The collector of Q–31 is connected directly to output terminal X which in turn is connected directly to the input terminals B–4 and B–5 of the respective "AND" gates G–4 and G–5 and is also connected through resistor R–51 to bus 26a. The base of Q–31 is connected through resistor R–31 to input terminal J which in turn is connected directly to input terminal A–1 of "AND" gate G–1.

Resistor R–51 provides means for placing output terminal X at a sufficiently high positive voltage, but transistor Q–31 provides means for selectively overriding the relatively high positive voltage furnished by resistor R–51 under conditions when the input of current limiting resistor R–31 is at a sufficiently high positive voltage. Resistor R–51 and transistor Q–31 form a voltage divider having an output taken off at the junction therebetween. Transistor Q–31 is selectably made a low impedance in relation to resistor R–51 when a sufficiently high positive voltage is applied to the input at current limiting resistor R–31. But transistor R–31 will be a high impedance in relation to R–51 as zero voltage is impressed at input J. That is, when a positive voltage is impressed at input J, transistor Q–31 is driven into conduction or into a low impedance condition and the voltage at output X will be essentially zero, but if input X is at essentially zero voltage transistor Q–31 does not conduct and is in a high impedance state with the output at terminal X being a relatively high positive voltage.

The constructions of "AND" gates G–2 through G–6 are the same as the construction of "AND" gate G–1 so that only the latter will be described in detail. "AND" gate G–1 consists of diodes CR–1, CR–2, transistor Q–21 and resistor R–61. Transistor Q–21 is an NPN type having its collector connected to positive bus 26a and its emitter connected to output terminal F–1. The base of transistor Q–21 is connected through resistor R–61 to bus 26a. The anodes of both diodes CR–1 and CR–2 are also connected to the base of Q–21 while the cathodes of CR–1 and CR–2 are connected to input terminals A–1 and B–1, respectively.

Resistor R–61 provides means for biasing transistor Q–21 to its conductive state. However, diodes CR–1 and CR–2 provide means for overriding the bias furnished by R–61 by selectively dividing or shunting bias current away from the base of Q–21. The bias furnished by R–61 is overridden if either input A–1 or B–1 is forced to essentially zero voltage. However, if inputs A–1 and B–1 are simultaneously forced to relatively high positive voltage levels, both diodes CR–1 and CR–2 will be inactive and will not override the biased current for Q–21. Thus, "AND" gate G–1 will provide output to drive conductor switch unit Q–1a into conduction only when both inputs of "AND" gate G–1 are at a sufficiently high positive voltage.

Operation of the logic system hereinbefore described proceeds in the following manner. With light shield 21 at the position shown in FIG. 3, only photosensitive device P–1 is illuminated. Thus, it can be said that P–1 is in a logical "1" state and photosensitive devices P–3 and P–5 are each in the logical "0" state. Inverter I–1 will be driven while inverters I–3 and I–5 will not. Thus the output at X will be in the logical "0" state and the outputs at Y and Z will each be in the logical "1" state.

Under the foregoing conditions the following logic levels will appear at the inputs and outputs of "AND" gates G–1 through G–6. Logical "1" state appears at inputs A–1, B–1, A–2, B–2, B–3 and B–6 while logical "0" state appears at inputs A–3, A–4, B–4, A–5, B–5 and A–6. Thus, logical "1" state is present at outputs F–1 and F–2 while logical "0" state is present at outputs F–3, F–4, F–5 and F–6. Logical "1" state at outputs F–1 and F–2 will produce sufficient positive output voltage to drive switch units Q–1a and Q–2b into conduction while outputs F–3 through F–6 will have essentially zero voltage output so that switches Q–3a, Q–4b, Q–5a and Q–6b will be in the "off" or non-conducting states. When switches Q–1a and Q–2b are conducting, the current in winding 30 is in such a direction as to produce a torque acting clockwise on rotor 17 so that the rotatable members will move to a new position where both photosensitive devices P–1 and P–3 are illuminated.

At this new position, photosensitive devices P–1 and P–3 are in the logical "1" state and P–5 is in the logical "0" state. Inverter outputs X and Y will be in the logical "0" state and inverter output Z will be in the logical "1" state. Under these conditions the following logic levels will appear at the terminals of "AND" gates G–1 through G–6. The logical "1" state appears at inputs A–1, A–2, B–2, A–3, B–3 and A–4 while the logical "0" state appears at input terminals B–1, B–4, A–5, B–5, A–6 and B–6. This produces the logical "1" state at outputs F–2 and F–3 while producing the logic "0" state at outputs F–1, F–4, F–5 and F–6. Thus, "AND" gates G–2 and G–3 will produce sufficient usable voltage to drive switch elements Q–2b and Q–3a into their conducting states while "AND" gates G–1, G–4, G–5 and G–6 will have essentially zero output voltage so that switches Q–1a, Q–4b Q–5a and Q–6b will be in their "off" or nonconducting states. With switches Q–2b and Q–3a conducting, the current in armature winding 30 will cause a clockwise torque to act on rotor 17 and the rotatable members will be moved still further clockwise until only photosensitive device P–3 will be illuminated. Similar action continues for the remainder of the rotational cycle for light shield 21 so that for any given position of rotor 17 two of the solid state switches will be conducting and four will be nonconducting.

In FIG. 4 the outputs of photosensitive elements P–1, P–3, P–5 and gates G–1—G–6 are shown plotted as functions of the angular position for rotor shaft 16.

The circuitry for solid state switching devices Q–1a, Q–3a, Q–5a, Q–2b, Q–4b and Q–6b is described in my aforesaid co-pending application Ser. No. 524,016. Thus, for purposes of its application it is sufficient to note that input terminal 101 for switching device Q–1a is connected to one end of current limiting resistor, R–1 which supplies a signal to the base of the input transistor of switching unit Q–1a. Similarly, input terminal 102 for switching device Q–2b is connected directly to one end of current limiting resistor, R–8 which supplies a signal to the base of the input transistor, Q–10.

While the brushless DC motor hereinbefore described can be made to run in either direction, provisions have not been shown to instantaneously change from one direction of a rotation to the other. FIG. 5 shows a modification for the logic circuitry of FIG. 3 to produce a motor that may be instantaneously reversed. More particularly, in the construction of FIG. 5 two sets of "AND" gates G–1a through G–6a and G–1' through G–6' are shown. The gates of one set G–1a through G–6a are activated for clockwise rotation while the other set of gates G–1' through G–6' are activated for counterclockwise direction of rotation. "OR" gates OR–1 through OR–6 couple the active set of "AND" gates to the appropriate switching devices Q–1a, Q–2b, Q–3a, Q–4b, Q–5a and Q–6b.

Figure 6:
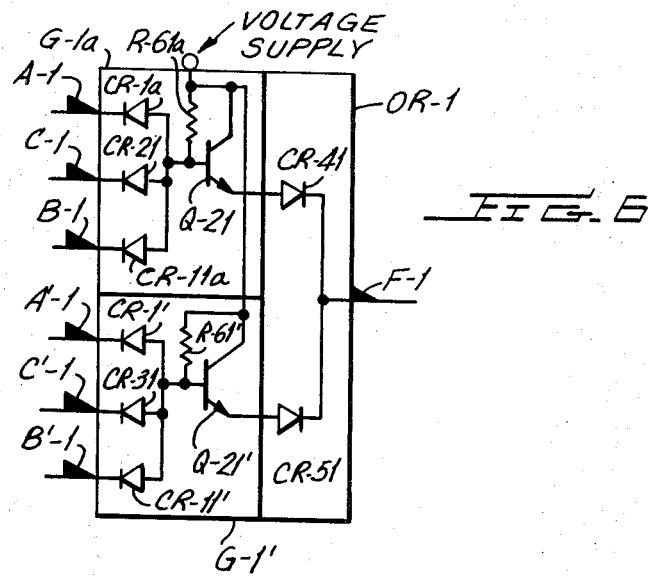
FIG. 6 is an electrical schematic of one of the "AND" gates of FIG. 5.

FIG. 6 is an electrical schematic of the combined elements G–1a, G–1', and OR–1. Gate G–1a of FIG. 5 is like gate G–1 of FIG. 3 except that diode CR–21 has been added as a third input C–1 connected to bus 47 together with the third inputs C–2 through C–6. The third inputs C'–1 through C'–6 of "AND" gates G–1' through G–6', respectively, are connected to bus 48. When bus 47 is energized with a positive voltage (logical "1") gates G–1a through G–6a are enabled and the motor will run clockwise through the action of input AB as explained in connection with FIG. 3. Similarly, when bus 48 is energized with a positive voltage (logical "1") gates G–1' through G–6' are enabled and the motor will run counterclockwise because of reverse signal routing, or the application of signals reversed with respect to the explanation given in connection with FIG. 3.

Protective device 90 is inserted in series with lines 47 and 48 to prevent damage which would otherwise occur if lines 47 and 48 were accidentally energized simultaneously. Briefly, protective device 90 includes inverter 51 having its output connected to one input of "AND" gate 53 and its input connected to the counterclockwise command terminal 48a. The other input terminal for "AND" gate 53 is connected directly to clockwise command terminal 47a while the output terminal for gate 53 is connected directly to line 47. Terminal 48a is also connected to one input for "AND" gate 54 whose output is connected directly to line 48. The other input terminal for gate 54 is connected to the output of inverter 52 having its input connected to terminal 47a. It should now be obvious that if positive signals are applied at both terminals 47a and 48a inverters 51 and 52 will apply logical "0" signals at one input of each gate 53 and 54, respectively, so that these gates remain in their blocking states. However, if a command signal is applied at only one of the terminals 47a, 48a, say at terminal 47a, then logical "1" signals will be applied at both inputs for gate 53 and a logical "1" signal will be applied at line 47.

FIG. 7 shows a modification of the logical circuitry in FIG. 3. In particular the "AND" gates and inverters of FIG. 3 are replaced in FIG. 7 by "INHIBIT" gates G–1b through G–6b. As is well known to the computer art, each of the "INHIBIT" gates G–1b through G–6b will produce a logical "1" output only when input A is a positive voltage and input B is essentially zero voltage. Input B is an inhibit input which causes the output to be essentially zero voltage when input B is driven with a positive voltage, regardless of the condition at input A. In addition if input A is "0" the output will be "0" regardless of the condition at input B.

Since "INHIBIT" gates G–2b through G–6b are of identical construction with that of "INHIBIT" gate G–1b only the latter will be described in detail. "INHIBIT" gate G–1b consists of NPN transistor Q–41, diode CR–61 and resistors R–71, R–81 and R–91. The emitter of Q–41 is connected directly to negative power bus 25a while the collector of Q–41 is connected to the anode of CR–61 and is also connected through resistor R–71 to input terminal A–1. The cathode of CR–61 is connected directly to output terminal F–1, while the base of Q–41 is connected through resistor R–81 to input terminal B–1 and is also connected through resistor R–91 to negative power bus 25a.

Resistor R–71 and the impedance of Q–41 effectively form a voltage divider in which the impedance of Q–41 is either very high or very low relative to the value of resistor R–71. The impedance of Q–41 is controlled by the presence or absence of a positive voltage signal at input B–1. That is, with a positive signal at input B–1, Q–41 is driven into conduction, or saturation, and the impedance of Q–41 is relatively low as compared to resistor R–71. Hence, when a positive voltage is present at both terminals A–1 and B–1, most of the voltage at terminal A–1 will appear across resistor R–71 and there will be only a slight voltage drop across Q–41. The small voltage drop across Q–41 is less than the voltage necessary to forward bias diode CR–61 to conduction so that the output signal at terminal F–1 is essentially zero.

If there is an absence of signal (essentially zero voltage) at input terminal A–1 there will also be an absence of signal at output terminal F–1 regardless of the absence or presence of a signal at input terminal B–1.

When a positive voltage signal is present at terminal A–1 and no signal (essentially zero voltage) is present at input terminal B–1, the base of transistor Q–41 is not driven and Q–41 remains in the high impedance or cut-off state. Under these circumstances the voltage at input terminal A–1 also appears at output terminal F–1, less the small voltage drop across resistor R–71 and diode CR–61.

Two sets of "INHIBIT" gates each having three inputs can be arranged in a manner similar to the circuitry of FIG. 5 to produce bidirectional motor rotation.

In the embodiments hereinbefore described the logic circuitry has been so constructed that shaft position indicating signals from three photosensitive devices have been utilized to produce six switching control signals for each revolution of the motor shaft while utilizing a light shield having a 180° aperture.

It should now be apparent to those skilled in the art that other element configurations may be utilized to produce six switching control signals for ecah shaft revolution by utilizing four or five photosensitive devices in conjunction with a light shield having a 180° aperture. Similarly, two photosensitive devices and associated logic circuitry can be connected to produce three switching control signals for each shaft revolution.

Figure 8:
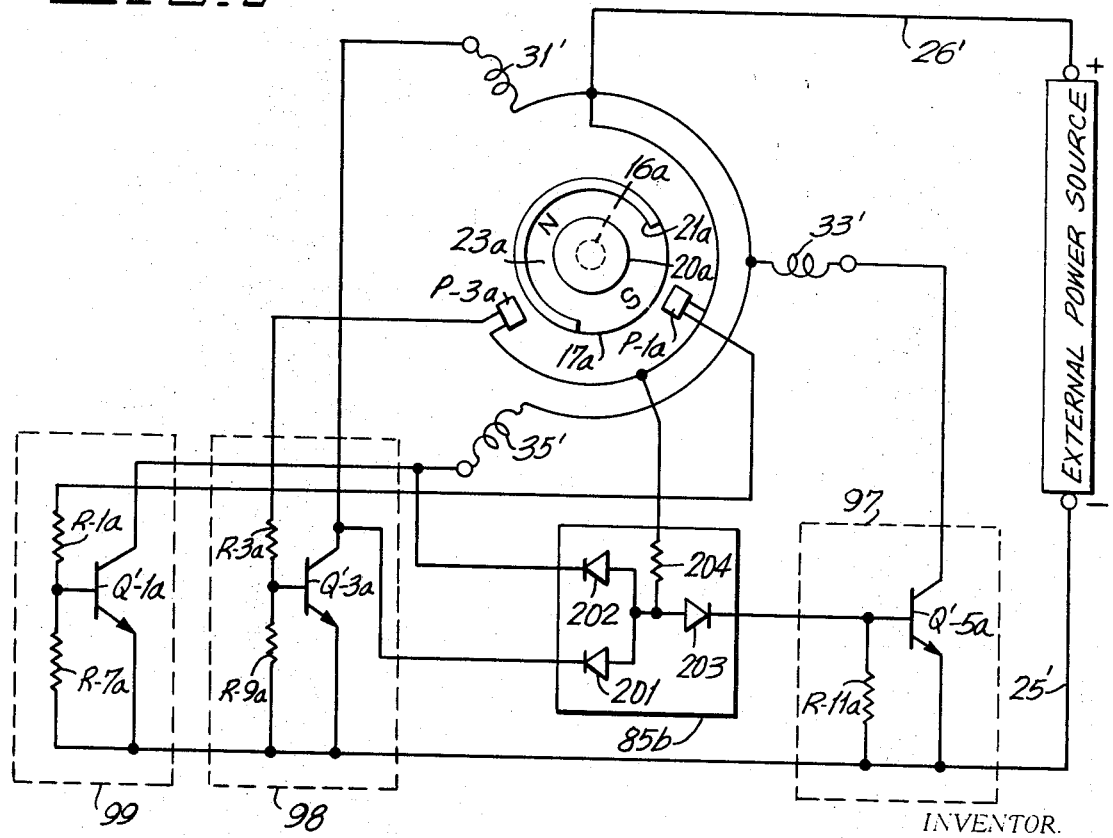
FIG. 8 is a schematic showing another modification for the commutating switching means of FIG. 3 utilizing only two radiation sensitive elements.

A construction of this latter type is shown in FIG. 8 in which photosensitive devices P–1a and P–3a are disposed 120° apart and receive light rays emitted from source 20a through 120° aperture 23a in light shield 21a, the latter being connected to motor shaft 16a which is driven by permanent magnet rotor 17a. Photosensitive device P–1a is connected from positive bus 26′ through resistors R–1a and R–7a to negative bus 25′ while photo device P–3a is connected from positive bus 26′ through resistors R–3a and R–9a to negative bus 25. The junction between resistors R–1a and R–7a is connected to the base of NPN transistor Q′–1a. Armature winding section 35′ is connected from positive bus 26′ through the emitter-collector circuit of Q′–1a to negative bus 25′. Armature winding section 31′ is connected from positive bus 26′ through the emitter-collector circuit of transistor Q′–3a to negative bus 25′. The base of Q′–3a is connected to the junction between resistors R–3a and R–9a.

Stator winding section 33′ is connected from positive bus 26′ through the emitter-base circuit of transistor Q′–5a to negative bus 25′. Transistor Q′–5a is part of solid state switching device 97 which also includes resistor R–11a connected between the base and the emitter of Q′–5a. The base of Q′–5a is fed by the output of logical device 85b. In particular, logical device 85b includes input diodes 201, 202, output diode 203, and resistor 204. The anodes of all three diodes 201, 202, 203 are connected at a common junction and resistor 204 extends from this junction to positive bus 26′.

The cathode of output diode 203 is connected to the base of Q′–5a, the cathode of input diode 201 is connected to the junction between winding 31′ and Q′–3a, and the cathode of input diode 202 is connected to the junction between winding 35′ and Q′–1a.

It is again noted that the circuitry of FIG. 8 produces three switching control signals for each revolution of rotor 17a while utilizing only two photosensitive devices P–1a and P–3a.

Thus, it is seen that the instant invention provides constructions for brushless DC motors in which there are at least three armature current switching signals produced for each revolution of the motor shaft while utilizing no more than two radiation sensitive elements for producing shaft position detecting control signals. This type of operation is achieved by utilizing logic circuitry having shaft position indicating signals fed to the inputs thereof and, in accordance wth such signals, producing switch controlling signals for switching current in the stator winding sections.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A brushless D.C. powered motor including energizing terminals for the application of D.C. power to said motor; a permanent magnet rotor; a stator winding means having a plurality of energizing taps; a plurality of solid state switching sections connected between said taps and said energizing terminals; a brushless commutating means for separating said switching sections in predetermined sequence to provide low impedance connections between said energizing terminals and predetermined ones of taps; said sequence being related to angular position of said rotor whereby current flow in said armature switches between said taps to provide a rotating flux field reacting with said rotor to generate motor torque; said commutating means comprising a source of radiation, a plurality of radiation sensitive elements for generating position control signals, apertured means connected to said rotor for directing radiation from said source to at least one of said elements in accordance with the angular position of said rotor, said apertured means being constructed to provide a beam of radiation sufficiently wide to irradiate two adjacent elements simultaneously when the center of the beam is intermediate said adjacent elements; and a logic system connected between said radiation sensitive elements and said switching sections; said logic system generating logic control signals related to said position control signals for each revolution of said rotor; said logic system including means for generating a different logic control signal for each pair of adjacent elements simultaneously illuminated; said logic control signals being fed to said switching sections for controlling operation thereof whereby currents in said winding means are switched a predetermined number of times for each revolution of said rotor; said predetermined number exceeding the number of radiation sensitive elements in said plurality of radiation sensitive elements.

2. A brushless D.C. motor as set forth in claim 1 in which said plurality of radiation sensitive elements are at least three in number.

3. A brushless D.C. motor as set forth in claim 1 in which said logic system includes a plurality of coincidence gates.

4. A brushless D.C. motor as set forth in claim 3 also including inverter means; circuit means connecting said radiation sensitive elements through said inverter means to predetermined inputs of said gates; other circuit means bypassing said inverter means and connecting said radiation sensitive elements to other inputs of said gates.

5. A brushless D.C. motor as set forth in claim 3 in which each of said plurality of coincidence gates is a unit having two inputs.

6. A brushless D.C. motor as set forth in claim 3 in which each of said coincidence gates is a double section unit with each section thereof having there inputs, and means for controlling direction of motor rotation by electronically activating only a predetermined section of said double section unit.

7. A brushless D.C. motor as set forth in claim 3 in which said coincidence gates are equal in number to two times the number of said plurality of radiation sensitive elements and said predetermined number is twice the number of said plurality of radiation sensitive elements.

8. A brushless D.C. motor as a set forth in claim 7 in which said plurality of radiation sensitive elements are three in number.

9. A brushless D.C. motor as set forth in claim 7 also including a plurality of inverter units equal in number to said plurality of radiation sensitive elements; circuit means connecting said radition sensitive elements through said inverter units to predetermined inputs of said gates; other circuit means bypassing said inverter units and connecting said radiation sensitive element to other inputs of said gates.

10. A brushless D.C. motor as set forth in claim 9 in which each of said gates, said inverter units, and said radiation sensitive elements constitutes a two level output device.

References Cited

UNITED STATES PATENTS

| | | | |
|---|---|---|---|
| 3,324,369 | 6/1967 | Markakis | 318—254 XR |
| 3,345,547 | 10/1967 | Dunne | 318—254 XR |
| 3,353,076 | 11/1967 | Haines | 318—254 XR |
| 3,355,644 | 11/1967 | Goslin et al. | 318—254 XR |
| 3,359,474 | 12/1967 | Welch et al. | 318—254 XR |
| 3,374,410 | 3/1968 | Cronquist et al. | 318—254 XR |

GLEN SIMMONS, Primary Examiner

U.S. Cl. X.R.

318—254